US012680675B2

(12) United States Patent
He

(10) Patent No.: US 12,680,675 B2
(45) Date of Patent: Jul. 14, 2026

(54) LED LAMP WITH FOUR-WIRE DOUBLE-SIDED PCB

(71) Applicant: Shangyou Jiayi Lighting Product Co., LTD., Ganzhou (CN)

(72) Inventor: Yaowen He, Ganzhou (CN)

(73) Assignee: Shangyou Jiayi Lighting Product Co., LTD., Ganzhou (CN)

( * ) Notice: Subject to any disclaimer, the term of this patent is extended or adjusted under 35 U.S.C. 154(b) by 0 days.

(21) Appl. No.: 19/002,216

(22) Filed: Dec. 26, 2024

(65) Prior Publication Data

US 2025/0216058 A1 Jul. 3, 2025

(30) Foreign Application Priority Data

Dec. 29, 2023 (CN) ........................ 202311871132.7

(51) Int. Cl.
*F21V 19/00* (2006.01)
*F21V 23/06* (2006.01)
*F21Y 107/90* (2016.01)
*F21Y 113/00* (2016.01)
*F21Y 115/10* (2016.01)

(52) U.S. Cl.
CPC .......... *F21V 19/0015* (2013.01); *F21V 23/06* (2013.01); *F21Y 2107/90* (2016.08); *F21Y 2113/00* (2013.01); *F21Y 2115/10* (2016.08)

(58) Field of Classification Search
CPC ...... F21Y 2107/90; F21Y 2101/00; F21S 4/10
See application file for complete search history.

(56) References Cited

U.S. PATENT DOCUMENTS

| | | | | |
|---|---|---|---|---|
| 10,161,583 | B1 * | 12/2018 | Stobart | F21S 9/037 |
| 10,941,914 | B1 * | 3/2021 | Hollinger | F21V 21/0824 |
| 11,466,830 | B1 * | 10/2022 | Zheng | F21V 23/004 |
| 2007/0103901 | A1 * | 5/2007 | Reid | F21K 9/23 362/234 |
| 2011/0110071 | A1 * | 5/2011 | Little, Jr. | F21K 9/232 362/249.02 |
| 2013/0107517 | A1 * | 5/2013 | Shih | F21V 7/0016 362/235 |
| 2018/0106432 | A1 * | 4/2018 | Bergenek | F21V 7/05 |
| 2023/0420421 | A1 * | 12/2023 | Liu | H10W 90/00 |

* cited by examiner

*Primary Examiner* — Evan P Dzierzynski

(57) ABSTRACT

An LED lamp with a four-wire double-sided PCB includes a PCB, wherein the PCB is provided with a first LED luminous body and a second LED luminous body, respectively at the central regions of the obverse and reverse sides of the PCB to realize 360° light emission; the PCB is also sequentially provided with four electrodes around any one of the two central regions, wherein two electrodes are respectively configured to be connected with different signal terminals of the two LED luminous bodies; the remaining two electrodes are respectively configured to be connected with different power supply terminals of the two LED luminous bodies. The LED lamp provided by the present disclosure can emit light on both sides, and truly realize 360° light emission.

4 Claims, 4 Drawing Sheets

LED LAMP WITH FOUR-WIRE DOUBLE-SIDED PCB

CROSS-REFERENCE TO RELATED APPLICATION

This application claims priority from the Chinese patent application 2023118711327 filed Dec. 29, 2023, the content of which is incorporated herein in the entirety by reference.

TECHNICAL FIELD

The present disclosure relates to LED lamps, and more particularly, to an LED lamp with a four-wire double-sided PCB.

BACKGROUND

On the one hand, the LED luminous bodies (including LED lamp bead chips and possible driving chips, etc.) in the LED lamp are generally small, and the mating pads are also small, so the technical problem of welding short circuit is easy to occur when welding wires. In addition, when there are more and more LED lamp beads on the lamp string, the wires in matching connection with the LED lamps become thicker and thicker to improve the carrying capacity. The new problem is that it is more and more inconvenient to directly weld the LED luminous bodies on the thicker wires as the wires become thicker.

On the other hand, LED luminous bodies that are spaced apart from each other on linear conductors often have insufficient light-emitting surfaces, and there is an urgent need for linear lamps and lamp strings with 360° circumferential light emission in the art.

In view of this, it is necessary to develop a new technical solution of LED lamp to overcome the above technical problems.

SUMMARY

In view of this, the present disclosure provides an LED lamp with a four-wire double-sided PCB, including:

a PCB, wherein the PCB is provided with a first LED luminous body and a second LED luminous body at the central regions of the obverse and reverse sides of the PCB, respectively to realize 360° light emission;

the PCB is also sequentially provided with a first electrode, a second electrode, a third electrode and a fourth electrode around any one of the two central regions, wherein the first electrode and the third electrode are respectively configured to be connected with different signal terminals of the two LED luminous bodies;

the second electrode and the fourth electrode are respectively configured to be connected with different power supply terminals of the two LED luminous bodies.

Preferably, the first LED luminous body and the second LED luminous body are in a parallel relationship.

Preferably, at least any one of the first electrode, the second electrode, the third electrode and the fourth electrode are arranged on the PCB in a manner of penetrating through the obverse and reverse sides of the PCB; or, at least any one of the first electrode, the second electrode, the third electrode and the fourth electrode are arranged on one side of the PCB in a manner of not penetrating through the obverse and reverse sides of the PCB.

Preferably, under the condition that there is an electrode arranged on one side of the PCB in a manner of not penetrating through the obverse and reverse sides of the PCB, the electrode is connected to the LED luminous body arranged on the other side of the PCB by means of a via.

Preferably, the LED lamp can form front-and-rear cascaded lamps with other LED lamps with the same structure through the first electrode to the fourth electrode and a linear conductor with at least three strands of wires.

Preferably, the first linear conductor and the second linear conductor respectively pass through a lower surface of one side of the PCB and are respectively connected with the second electrode and the fourth electrode.

Preferably, the third linear conductor is cut into two sections in advance, and the two sections of the linear conductor pass through the lower surface of the same side of the PCB through which the first linear conductor and the second linear conductor pass, and are respectively connected with the first electrode and the third electrode.

Preferably, a first broken linear conductor formed after cutting extends from the exterior of the PCB into the lower surface of one side of the PCB and is blocked by one edge of the LED luminous body arranged on the side of the PCB, and a second broken linear conductor formed after cutting extends outward from the other edge of the LED luminous body arranged on the side of the PCB to the exterior of the PCB.

Preferably, the first LED luminous body and the second LED luminous body may be arbitrarily connected to the second electrode or the fourth electrode regardless of polarity.

Preferably, all the LED luminous bodies, all the electrodes, and the linear conductors passing through the lower surface of one side of the PCB and connected with the corresponding electrodes are subjected to injection molding on the obverse and reverse sides of the PCB to form an injection molding lamp.

To sum up, the LED lamp provided by the present disclosure may be subjected to double-sided LED surface mount to emit light on both sides, and truly realize 360° light emission; under the condition that the LED luminous bodies on both sides are normal, the situation that the obverse side is bright and the reverse side is dark will not occur, and the problems in the prior art that the luminous point is amplified due to the fact that only one side of the LED lamp emits light, and there is a shadow will not occur. Moreover, the structure of such LED lamp means that a good yield and high production efficiency can be maintained even if the wires become thick, only by soldering or otherwise electrically connecting two wires for power supply and a wire for signal transmission to corresponding electrodes arranged on the PCB.

BRIEF DESCRIPTION OF FIGURES

In order to illustrate the technical solutions of the embodiments of the present disclosure more clearly, the drawings required for use in the embodiments will be briefly described below, it is to be understood that the following drawings illustrate only certain embodiments of the present disclosure and are therefore not to be considered limiting in scope, and that other related drawings can be obtained from these drawings without inventive step for a person having ordinary skill in the art.

Figure 1:
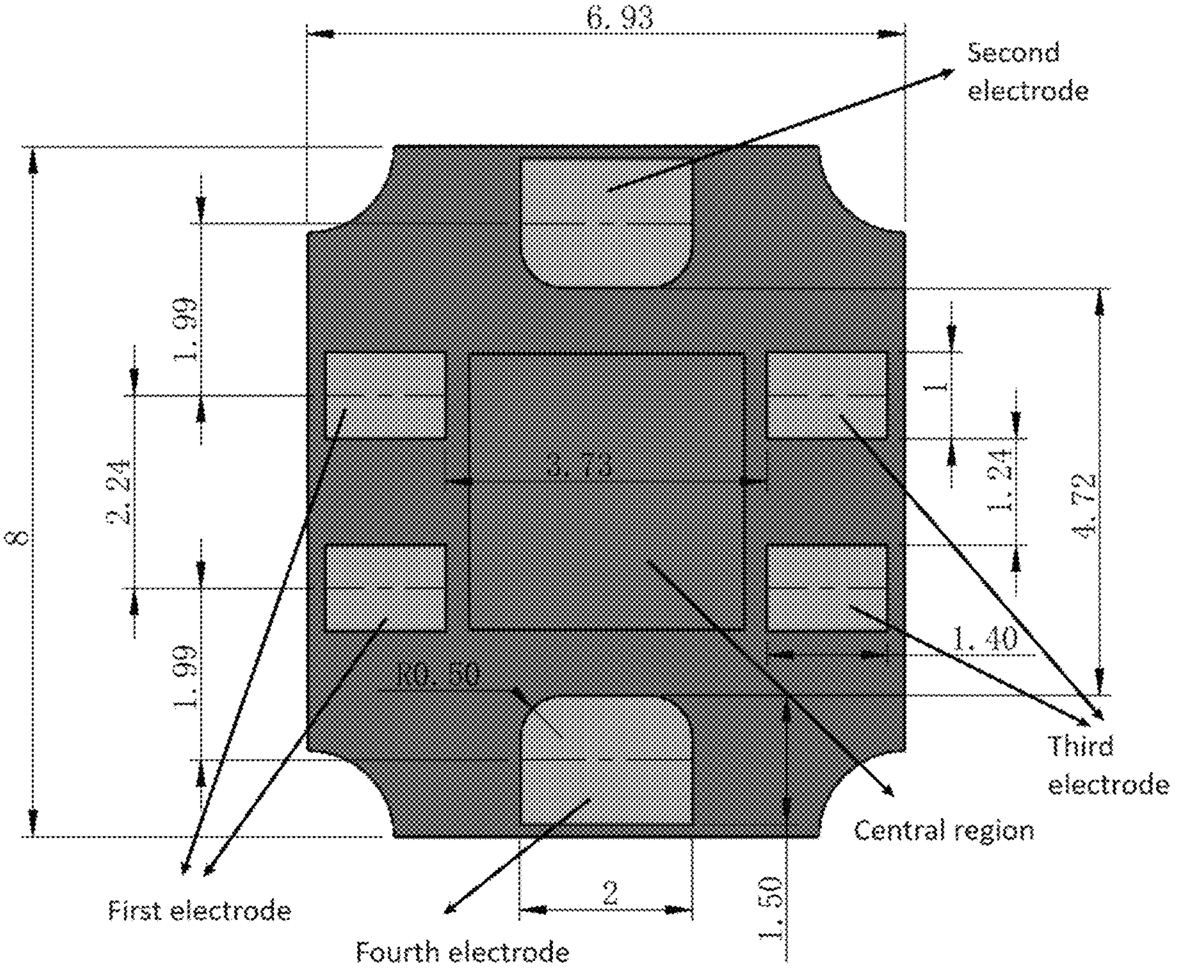
FIG. 1 is a schematic diagram of a reverse side of a PCB in an LED lamp according to an embodiment of the present disclosure.

It should be noted that the above drawings do not limit the dimensional proportions between the lines and the LED luminous body, the various ICs and other parts, and the drawings are more illustrative of the structures and connections, spatial positions, and the like.

DETAILED DESCRIPTION

In order to make the objects, technical solutions and advantages of the embodiments of the present disclosure clearer, the technical solutions in the embodiments of the present disclosure will be clearly and completely described below in conjunction with the FIGS. 1 to 7 of the embodiments of the present disclosure, and it is obvious that the described embodiments are part of the embodiments of the present disclosure, rather than all of the embodiments. The components of the embodiments of the present disclosure generally described and shown in the figures herein may be arranged and designed in a wide variety of different configurations.

Thus, the following detailed description of the embodiments of the disclosure, as provided in the figures, is not intended to limit the scope of the claimed disclosure, but is merely representative of selected embodiments of the disclosure. All other embodiments obtained by those having ordinary skill in the art based on the embodiments in the present disclosure without making inventive labor belong to the scope of protection of the present disclosure.

It should be noted that like reference numerals and letters represent like items in the following figures, and therefore, once an item is defined in one figure, it does not need to be further defined and explained in the subsequent figures.

In the description of the disclosure, it needs to be noted that the orientation or positional relationship indicated by the terms “upper”, “lower”, “inner”, “outer” and the like is based on the orientation or positional relationship shown in the drawings, or the orientation or positional relationship that is conventionally placed in use of the invented product, is merely for ease of description of the disclosure and for simplicity of description, and is not intended to indicate or imply that the device or element being referred to must have a particular orientation, be constructed and operate in a particular orientation, and is therefore not to be construed as limiting the disclosure.

Furthermore, the terms “first” and “second” are used only to distinguish descriptions and are not to be understood as indicating or implying relative importance.

It is to be noted that the features in the embodiments of the present disclosure may be combined with each other without conflict.

Figure 2:
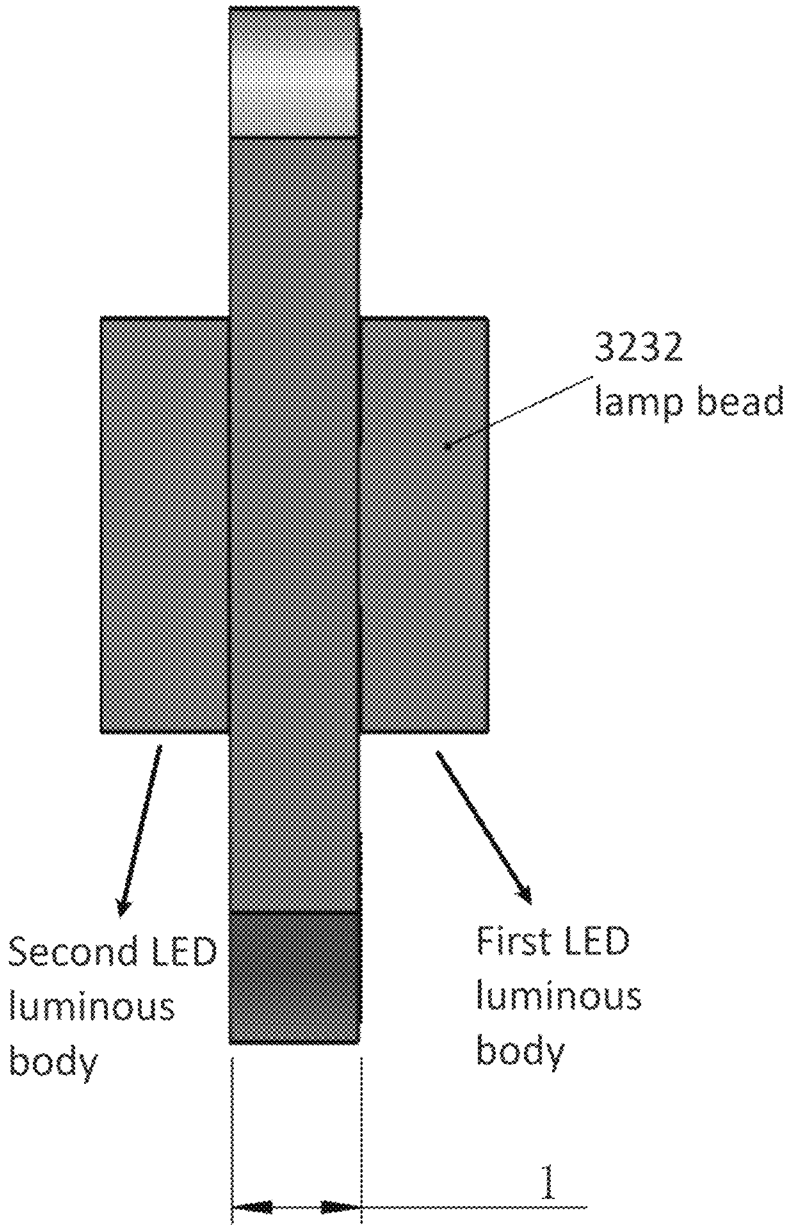
FIG. 2 is a schematic diagram of a side face of the LED lamp according to an embodiment of the present disclosure.

Referring to FIGS. 1 and 2, in one embodiment, the present disclosure provides an LED lamp with a four-wire double-sided PCB, including:

a PCB, wherein the PCB is provided with a first LED luminous body and a second LED luminous body at the central regions of the obverse and reverse sides of the PCB, respectively to realize 360° light emission;

the PCB is also sequentially provided with a first electrode, a second electrode, a third electrode and a fourth electrode around any one of the two central regions, wherein the first electrode and the third electrode are respectively configured to be connected with different signal terminals of the two LED luminous bodies;

the second electrode and the fourth electrode are respectively configured to be connected with different power supply terminals of the two LED luminous bodies.

It should be noted that the dimension unit in FIGS. 1 and 2 is millimeters, in which, taking the first LED luminous body as an example, the LED luminous body includes a 3232 lamp bead. Preferably, the LED luminous body is arranged in a central region of the PCB in a surface-mount manner. As can be appreciated, each electrode corresponds to a corresponding pad. Exemplarily, the first to fourth electrodes are arranged on the PCB in a clockwise direction. Since the four electrodes correspond to the four wires connected to the four electrodes, the present disclosure discloses an LED lamp with a four-wire double-sided PCB. The advantages of using a PCB are that the circuit is easy to arrange, and certain mechanical properties are possessed. Other advantages include being able to adapt to thicker and thicker wires as linear conductors, improving the yield of LED lamps and facilitating welding.

In another embodiment, the power supply terminals include a positive terminal and a negative terminal, or a neutral wire terminal and a live wire terminal.

Referring to FIG. 1, in another embodiment, in order to provide the stability of signal transmission, the first electrode and the third electrode each include two exposed electrode regions.

Figure 3:
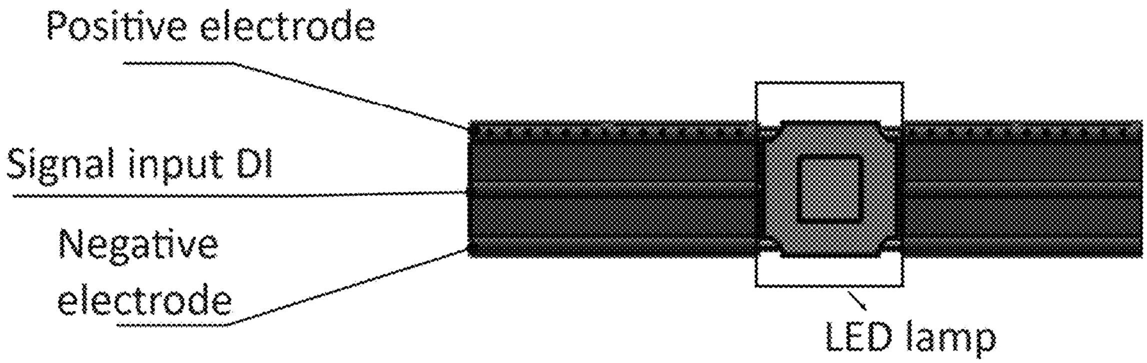
FIG. 3 is a schematic diagram of a linear conductor with a plurality of strands of wires and an LED lamp in the LED lamp according to an embodiment of the present disclosure.

Referring to FIG. 3, in another embodiment, the LED lamp is arranged on a linear conductor with three strands of wires, and divides the linear conductor into two parts.

It can be found that among the three wires in the linear conductor with three strands of wires, exemplarily, two wires may be connected to the positive and negative electrodes so as to power the LED lamp and, exemplarily, the remaining one wire may be connected to the signal input DI, or DIN. It can be understood that the plurality of strands of wires are spaced apart from each other and insulated from each other.

In another embodiment, the signal terminals include a signal input DIN terminal, a signal output DOUT terminal, and the like.

Referring to FIG. 1, in another embodiment, the first electrode is configured to be connected with one signal terminal of the first LED luminous body, and be connected with one signal terminal of the second LED luminous body;

the third electrode is configured to be connected with the other signal terminal of the first LED luminous body, and be connected with the other signal terminal of the second LED luminous body;

the second electrode is configured to be connected with one power terminal of the first LED luminous body, and be connected with one power terminal of the second LED luminous body;

the fourth electrode is configured to be connected with the other power terminal of the first LED luminous body, and be connected with the other power terminal of the second LED luminous body.

In another embodiment, the first LED luminous body and the second LED luminous body are in a parallel relationship.

In another embodiment, at least any one of the first electrode, the second electrode, the third electrode and the fourth electrode are arranged on the PCB in a manner of penetrating through the obverse and reverse sides of the PCB; or, at least any one of the first electrode, the second electrode, the third electrode and the fourth electrode are arranged on one side of the PCB in a manner of not penetrating through the obverse and reverse sides of the PCB.

In another embodiment, under the condition that there is an electrode arranged on one side of the PCB in a manner of not penetrating through the obverse and reverse sides of the PCB, the electrode is connected to the LED luminous body arranged on the other side of the PCB by means of a via.

Referring to FIGS. 1 and 3, it can be found that in the embodiment shown in FIG. 3, if the viewing angle of FIG. 3 is viewed as the front of the LED lamp, there are no visible electrodes on the front. However, the LED luminous body on the front necessarily needs to be electrically connected, so an alternative implementation may be that the electrode on the back is connected to the front LED luminous body through a via in the PCB.

Figure 4:
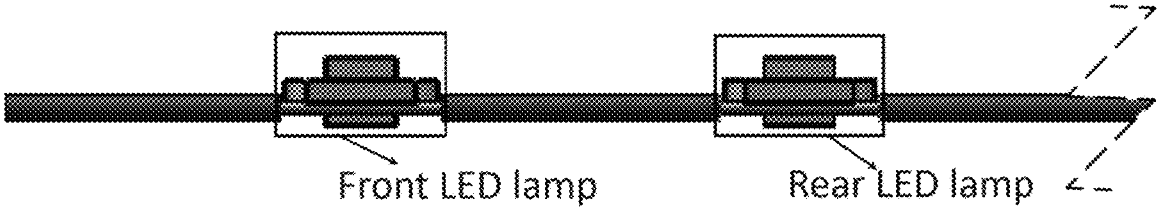
FIGS. 4 to 6 are schematic diagrams of front-and-rear cascaded LED lamps and a lamp string thereof according to an embodiment of the present disclosure.
Figure 5:
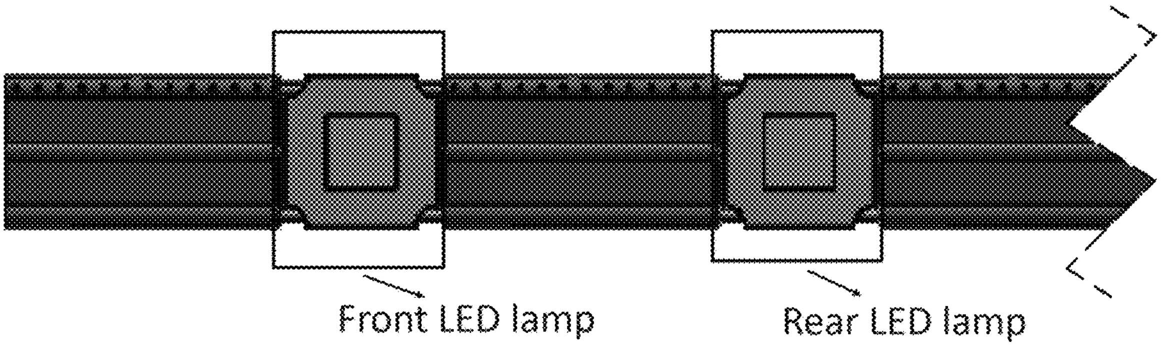

Referring to FIGS. 4 and 5, in another embodiment, the LED lamp can form front-and-rear cascaded lamps with other LED lamps with the same structure through the first electrode to the fourth electrode and a linear conductor with at least three strands of wires.

In another embodiment, the linear conductor with at least three strands of wires is a rubber cable.

Figure 6:
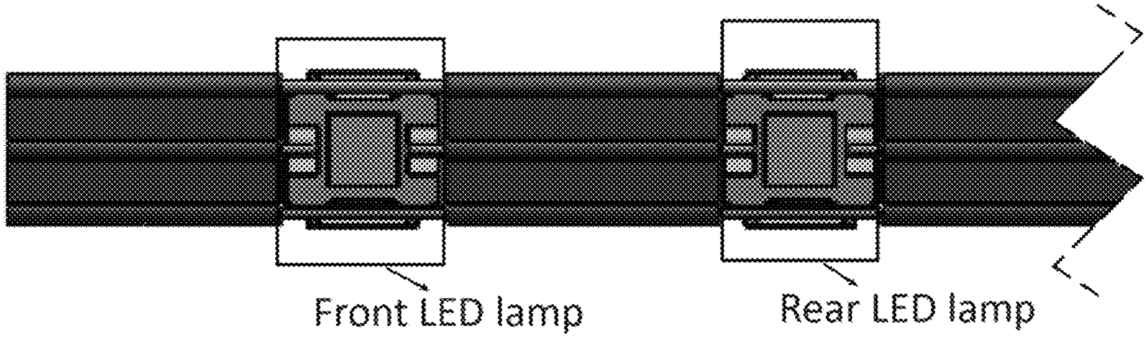

Referring to FIGS. 1 and 6, in another embodiment, the first linear conductor and the second linear conductor respectively pass through a lower surface of one side of the PCB and are respectively connected with the second electrode and the fourth electrode.

Further, in another embodiment, the third linear conductor is cut into two sections in advance, and the two sections of the linear conductor pass through the lower surface of the same side of the PCB through which the first linear conductor and the second linear conductor pass, and are respectively connected with the first electrode and the third electrode.

In another embodiment, the first linear conductor and the second linear conductor are substantially parallel.

In another embodiment, the third linear conductor is located between the first linear conductor and the second linear conductor and is parallel to the first linear conductor.

Further, in another embodiment, a first broken linear conductor formed after cutting extends from the exterior of the PCB into the lower surface of one side of the PCB and is blocked by one edge of the LED luminous body arranged on the side of the PCB, and a second broken linear conductor formed after cutting extends outward from the other edge of the LED luminous body arranged on the side of the PCB to the exterior of the PCB.

In another embodiment, the first broken linear conductor and the second broken linear conductor are substantially in a straight line.

The first broken linear conductor is connected with the first electrode;

the second broken linear conductor is connected with the third electrode.

Figure 7:
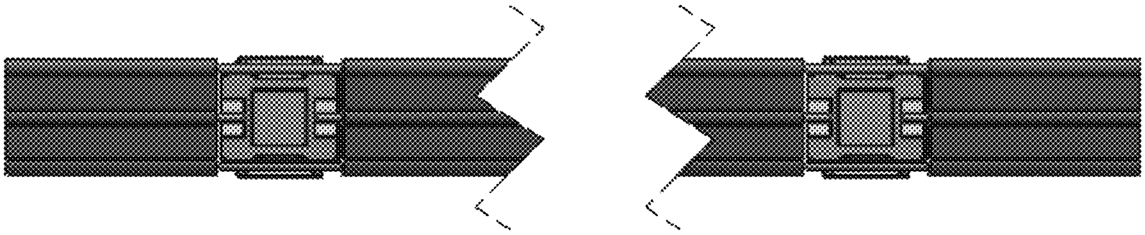
FIG. 7 is a schematic diagram of a lamp string being cut according to an embodiment of the present disclosure.

Referring to FIG. 7, in another embodiment, for the lamp string composed of the linear conductor with a plurality of strands of wires and the LED lamps, the portion between any two LED lamps can be cut.

It can be found that when the wire portion between two adjacent LED lamps is cut, it is convenient to use the lamp string according to the actual length requirements; when the portion between two LED lamps at intervals is cut, the fault portion is often cut, thus facilitating the maintenance of the lamp string.

Furthermore, in another embodiment, the first LED luminous body and the second LED luminous body may be arbitrarily connected to the second electrode or the fourth electrode regardless of polarity.

Exemplarily, an automatic polarity conversion circuit is arranged between any power supply terminal of the LED luminous body at any side of the PCB and the second electrode or the fourth electrode. In this way, even if the wire configured to be connected with the positive electrode is connected to the negative electrode of the power source by mistake, and the wire configured to be connected with the negative electrode is connected to the positive electrode of the power source by mistake in FIG. 3, the power supply terminals of the first LED luminous body and the second LED luminous body arranged on the obverse and reverse sides of the PCB can still be correctly connected to the positive electrode and negative electrode of the power source.

Further, exemplarily, the positive and negative electrodes of the LED luminous body at the obverse and reverse sides of the PCB may also be arranged opposite to each other. For example, the positive electrode of the LED luminous body at the obverse side of the PCB is the negative electrode of the other LED luminous body at a corresponding position on the reverse side of the PCB.

In summary, there are a number of ways to implement the lamp string as a polarity insensitive lamp string, otherwise referred to as an electrodeless lamp string.

In another embodiment, all the LED luminous bodies, all the electrodes, and the linear conductors passing through the lower surface of one side of the PCB and connected with the corresponding electrodes are subjected to injection molding on the obverse and reverse sides of the PCB to form an injection molding lamp.

In another embodiment, the two LED luminous bodies on the obverse and reverse sides of the PCB are LED luminous bodies of different colors.

In another embodiment, the LED luminous body includes point-control or breakpoint continuous transmission LED lamp beads and a driving unit thereof.

In another embodiment, two front-and-rear cascaded LED lamps each include corresponding front and rear PCBs, and two LED luminous bodies in front and rear on the two PCBs in front and rear, and the two LED luminous bodies in front and rear have a signal breakpoint continuous transmission function.

Referring to FIGS. 4-6, in another embodiment, a plurality of LED luminous bodies in the front and rear LED lamps form a series-parallel relationship of a plurality of LED lamp beads in the front-rear direction, thus forming a high-voltage lamp string.

In another embodiment, the main body of the PCB is polygonal or circular. In addition, missing corners may be arranged at the four corners of the PCB to facilitate positioning and manufacturing.

For example, in FIGS. 1 to 7, the main body of the PCB is square and has arc-shaped missing corners on the periphery. Taking FIG. 1 as an example, specific dimensional parameters are also illustrated, in millimeters. Further, the second and fourth electrodes have chamfered corners near the central region.

It should be noted that for FIGS. 3 to 7, a feasible process that can ensure the yield and efficiency includes: removing the insulation layer of each linear conductor through a cutting process such as a blade in advance, and then connecting each electrode on the PCB with the corresponding linear conductor, for example, by welding. As for a lamp string, the first and second linear conductors may be continuous with no need to use two sections of pre-cut electrode wires on both sides of the LED lamp to be connected with the LED lamp and the PCB included in the LED lamp. This is obviously beneficial to the improvement of manufacturing efficiency: it is only necessary to prepare a long enough linear conductor, remove its insulating layer in advance at the corresponding junction, and then connect the electrode at the junction with the corresponding linear conductor.

In addition, in FIGS. 3 and 5, the outer surface of the linear conductor corresponding to the positive electrode has a plurality of marking points to mark the positive and negative electrodes or the zero and live wires. Exemplarily, the corresponding linear conductor with the marking points is configured to be connected with the positive electrode.

The above description is only specific embodiments of the present disclosure, but the scope of protection of the present disclosure is not limited thereto, and any variations or substitutions easily conceivable by those skilled in the art within the technical scope of the present disclosure should be covered by the present disclosure. Therefore, the protection scope of the present disclosure should be subject to the protection scope of the claims.

What is claimed is:

1. An LED lamp with a four-wire double-sided PCB, comprising:

a PCB, wherein the PCB is provided with a first LED luminous body and a second LED luminous body at a first central region of an obverse side of the PCB and a second central region of a reverse sides of the PCB in a surface-mount manner, respectively to realize 360° light emission;

the PCB is also sequentially provided with a first electrode, a second electrode, a third electrode opposed to the first electrode and a fourth electrode around each of the first central region and the second central region; and the PCB has a main body and the main body of the PCB is square and has arc-shaped missing corners on the periphery; and the second and fourth electrodes have chamfered corners near the first and the second central regions; each of the first and third electrodes corresponds to two pads; and each of the second and fourth electrodes corresponds to one pad; and the first to fourth electrodes are arranged on the PCB in a clockwise direction; the two pads of the first electrode and the third electrode, and the second electrode and the fourth electrode are symmetrically disposed on a same centerline of the PCB;

wherein the first electrode and the third electrode are respectively configured to be connected with signal terminals of the two LED luminous bodies, and each of the signal terminals comprises a signal input DIN terminal, and a signal output DOUT terminal;

the first electrode is connected with one signal terminal of the first LED luminous body, and connected with one signal terminal of the second LED luminous body;

the third electrode is connected with the other signal terminal of the first LED luminous body, and connected with the other signal terminal of the second LED luminous body;

the second electrode is connected with one power terminal of the first LED luminous body, and be connected with one power terminal of the second LED luminous body;

the fourth electrode is connected with the other power terminal of the first LED luminous body, and connected with the other power terminal of the second LED luminous body;

the second electrode and the fourth electrode are respectively configured to be connected with power supply terminals of the two LED luminous bodies and each of the power supply terminals includes a positive terminal and a negative terminal;

the first LED luminous body and the second LED luminous body are in a parallel relationship;

the LED lamp is able to form front-and-rear cascaded lamps with other LED lamps with the same structure through the first electrode to the fourth electrode and is arranged on a linear conductor with at least three strands of wires and divides the linear conductor into two parts;

a first linear conductor and a second linear conductor respectively pass through a lower surface of one side of the PCB and are respectively connected with the second electrode and the fourth electrode;

a third linear conductor is cut into two sections in advance, and the two sections of the third linear conductor pass through the lower surface of the same side of the PCB through which the first linear conductor and the second linear conductor pass, and are respectively connected with the first electrode and the third electrode;

a first broken linear conductor formed after cutting extends from an exterior of the PCB into the lower surface of one side of the PCB and is blocked by one edge of the LED luminous body arranged on the side of the PCB;

a second broken linear conductor formed after cutting extends outward from the other edge of the LED luminous body arranged on the side of the PCB to an exterior of the PCB; and the first and second LED luminous bodies, the first, second, third and fourth electrodes, and the linear conductors passing through the lower surface of one side of the PCB and connected with the corresponding electrodes are subjected to injection molding on the obverse and reverse sides of the PCB to form an injection molding lamp.

2. The LED lamp according to claim 1, wherein at least any one of the first electrode, the second electrode, the third electrode and the fourth electrode are arranged on the PCB in a manner of penetrating through the obverse and reverse sides of the PCB; or, at least any one of the first electrode, the second electrode, the third electrode and the fourth electrode are arranged on one side of the PCB in a manner of not penetrating through the obverse and reverse sides of the PCB.

3. The LED lamp according to claim 2, wherein under the condition that there is an electrode arranged on one side of the PCB in a manner of not penetrating through the obverse and reverse sides of the PCB, the electrode is connected to the LED luminous body arranged on the other side of the PCB by means of a via.

4. The LED lamp according to claim 1, wherein each pad of first and the third electrode has a dimension of 1.4 mm by 1.0 mm, and each pad of the second and fourth electrode has a dimension of 2 mm by 1.5 mm.

* * * * *